United States Patent [19]

Park et al.

[11] Patent Number: 5,700,744
[45] Date of Patent: Dec. 23, 1997

[54] SEALING GLASS COMPOSITION

[75] Inventors: Tae Ho Park, Seoul; Chun Suk Kim, Suwon; Sung Hun Moon, Seoul, all of Rep. of Korea

[73] Assignee: Samsung Corning Co., Ltd., Kyeonggi-Do, Rep. of Korea

[21] Appl. No.: 625,362

[22] Filed: Apr. 1, 1996

[30] Foreign Application Priority Data

Mar. 31, 1995 [KR] Rep. of Korea .................. 95-7217

[51] Int. Cl.$^6$ .............................. C03C 8/20; C03C 3/066
[52] U.S. Cl. .................. 501/15; 501/18; 501/32; 501/76
[58] Field of Search .................. 501/15, 17, 18, 501/32, 76; 220/2.1 A

[56] References Cited

U.S. PATENT DOCUMENTS

| | | | |
|---|---|---|---|
| 2,889,952 | 6/1959 | Claypoole | 220/2.1 |
| 3,947,279 | 3/1976 | Hudecek | 501/2 |
| 4,097,296 | 6/1978 | Thomas, III et al. | 501/15 |
| 4,115,132 | 9/1978 | Suzuki et al. | 501/15 |
| 4,246,034 | 1/1981 | Kellberg | 501/15 |
| 4,405,722 | 9/1983 | Kokubu et al. | 501/15 |
| 4,589,899 | 5/1986 | Hudecek | 65/33 |
| 4,621,064 | 11/1986 | Matsuura et al. | 501/15 |
| 4,774,208 | 9/1988 | Yamanaka et al. | 501/15 |
| 5,145,803 | 9/1992 | Daimer et al. | 501/15 |
| 5,470,804 | 11/1995 | Morena | 501/15 |

FOREIGN PATENT DOCUMENTS

| | | |
|---|---|---|
| 40222973 | 9/1990 | Japan . |
| 406157071 | 6/1994 | Japan . |

*Primary Examiner*—Karl Group
*Attorney, Agent, or Firm*—Cushman Darby & Cushman Intellectual Property Group of Pillsbury Madison & Sutro LLP

[57] ABSTRACT

The glass panel and funnel of a color TV picture tube are sealed to one another at 420° C. within 20 minutes, using a composition which includes:

(a) 93–99.8 weight percent PbO—$B_2O_3$—ZnO devitrifiable glass powder made of:
  74–82 weight percent PbO,
  7–10 weight percent $B_2O_3$,
  8–12 weight percent ZnO,
  1–4 weight percent $SiO_2$,
  0.05–0.5 weight percent MgO,
  0.1–0.5 weight percent BaO, and
  0.1–0.5 weight percent F;

(b) 0.1–4.0 weight percent synthetic zircon having a specific surface area of 1.0–2.0 $m^2/g$, as a nucleating agent; and (c) 0.1–3.0 weight percent corderite, as a filler.

2 Claims, 1 Drawing Sheet

SEALING GLASS COMPOSITION

BACKGROUND OF THE INVENTION

1. Technical Field

The present invention relates to sealing glass composition, in particular, which is able to seal the panel and funnel of a color TV tube at a low temperature for a short time by adding small amount of synthetic zircon as a nucleating agent and cordierite as a filler component to control the thermal expansion coefficient.

2. Description of Related Prior Art

As disclosed in U.S. Pat. No. 2,889,952, a devitrifiable sealing glass composition used for sealing panel and funnel of color TV is $PbO$—$ZnO$—$B_2O_3$ glass, its sealing temperature being 440° C. and sealing time being about 1 hour. However, such a high sealing temperature and long sealing time lead to decreasing of productivity when manufacturing color TV picture tubes.

Accordingly, to increase productivity in manufacturing CRTs for color TVs, development and utilization of a sealing glass composition which is able to lower sealing temperature and to reduce sealing time have been required.

Until now, development has been carried out at two points, that is, one is lowering sealing temperature and the other is reducing sealing time.

First, to develop sealing glass compositions which have low melting point, glass softening temperature, compositions which are able to reduce sealing temperature are disclosed in U.S. Pat. Nos. 4,097,296 and 4,246,034, with $PbO$—$ZnO$—$B_2O_3$ glass containing fluorine.

Generally, $PbO$—$ZnO$—$B_2O_3$ glass compositions containing fluorine have to be used with low expansion filler because the thermal expansion coefficient is too high and mechanical strength is low. Normally, a mixture of mother glass and a compound selected from the group consisting of natural zircon ($ZrSiO_4$), lead titanate ($PbTiO_3$), cordierite, willemite, $\beta$-eucryptite and $\beta$-spodumene is used as filler.

The material used as the filler is different from the composition of mother glass. U.S. Pat. No. 4,097,296 discloses a glass composition with 2–6 wt % of natural zircon. And U.S. Pat. No. 4,246,034 discloses a glass composition with 4–10 wt % of cordierite.

In these inventions, a mixture of mother glass and a filler is used as a low expansion filler in order to reduce the high thermal expansion coefficient and improve low strength.

Glass compositions containing fluorine or alkaline oxide to lower the sealing temperature are effective for lowering the sealing temperature due to lowering the glass transition and softening temperature by making a loose structure via substituting network forming ions for fluorine or alkaline ions and cutting the network structure of the glass. But, while the sealing temperature is reduced, the thermal expansion coefficient is increased and mechanical strength is decreased. To make up for those problems, low expansion filler is added.

The sealing temperature is reduced to 20°–30° C. compared with the conventional composition, on the other hand sealing time is longer than conventional products. And decreasing of flowability by adding large amounts of filler have a bad effect for sealing.

In case of adding an alkaline element, sealing temperature is reduced and flowability is good, but it has problem that use for sealing of the panel and funnel of a color TV tube requiring high insulation, because alkaline ions in glass have a high electric mobility.

The second point of development of sealing glass composition is reducing sealing time. Prior art compositions for reducing sealing time are taught as follows:

U.S. Pat. No. 3,947,279 discloses, composition which is added precrystallized $PbO$—$ZnO$—$B_2O_3$ glass as seed and is able to seal a panel and funnel in 28 minutes at a sealing temperature of 445° C. U.S. Pat. No. 4,589,899 discloses a composition which is added zinc zirconium silicate as a nucleating agent and is able to seal in 15–25 minutes at 440° C.

However, in case of using a nucleating agent, crystallization time is reduced, but flowability which is necessary to seal is reduced because excess crystallization occurs before sufficient flow occurs, and mechanical strength is decreased due to excess growth of crystal. Because sealing temperature is not reduced, it has a limitation to improve of productivity of color TV Braun tubes due to sealing glass.

Taking side view of reducing sealing time, sealing is possible when crystallization is not enough. But, cracking on sealing glass occurs in a vacuum exhaust process at 350°–380° C. after sealing of the panel and funnel, because of the rapid changing of thermal expansion coefficient at the glass transition temperature due to excess of non-crystallized region. Although cracking of sealing glass does not occur, mechanical strength of sealing glass is decreased.

Furthermore, natural zircon used as a nucleating agent has a small specific surface area, microstructure is very fine and its particle surface is smooth.

Accordingly, heterogeneous nucleation sites are limited on the interface of natural zircon particles and mother glass particles and therefore growth of crystals is slow. If content of natural zircon is increased to provide heterogeneous nucleation sites, flowability cannot be insured by preventing wetting of sealing glass which is necessary to seal, because its role as a filler is superior to its role as nucleating agent, and the thermal expansion coefficient is extremely decreased.

Therefore, in order to solve the above problems, in this invention, a small amount of synthetic zircon instead of natural zircon as a nucleating agent and cordierite as a filler component are used, which are able to lower sealing temperature and reduce adhesive time.

SUMMARY OF THE INVENTION

The object of this invention is to provide a sealing glass composition which is able to lower sealing temperature, reduce sealing time and prevent premature crystallization and lowering of flowability due to adding a large amount, by acting sufficiently as filler and nucleating agent having a small amount of them.

The present invention is directed to a sealing glass composition characterized by 93.0–99,8 wt % of $PbO$—$ZnO$—$B_2O_3$ devitrifiable glass powder which comprises 74–84 wt % of $PbO$, 7–10 wt % of $B_2O_3$, 8–12 wt % of $ZnO$, 1–4 wt % of $SiO_2$, 0.05–0.5 wt % of $MgO$, 0.1–0.5 wt % of $BaO$ and 0.1–0.5 wt % of F, and the additives 0.1–4.0 wt % of synthetic zircon as a nucleating agent and 0.1–3.0 wt % of cordierite as a filler.

DETAILED DESCRIPTION OF THE INVENTION

Figure 1:
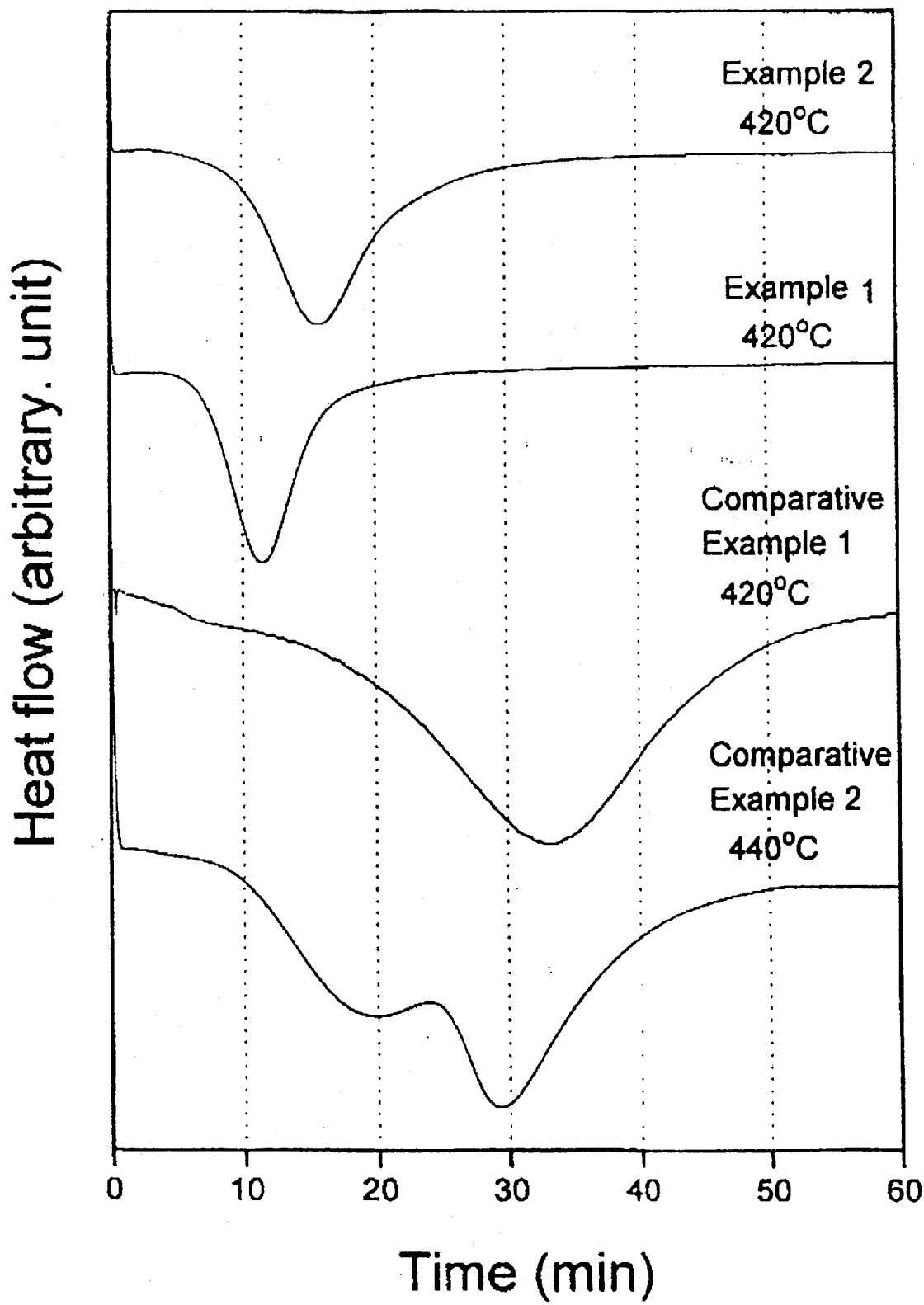
FIG. 1 is an isothermal DSC curve of sealing glass composition which is prepared by Examples 1–2 and Comparative Examples 1–2.

The sealing glass composition according to the present invention consists of $PbO$—$ZnO$—$B_2O_3$ glass powder, synthetic zircon as nucleating agent and cordierite as a filler component.

In the present invention, synthetic zircon is used as a nucleating agent, of which the specific surface area is larger than that of natural zircon. The synthetic zircon used in the present invention is more fine than natural zircon. The specific surface area of the synthetic zircon is within a range of 1.0–2.0 m$^2$/g preferably 1.338 m$^2$/g, whereas the specific surface area of natural zircon is 0.717 m$^2$/g. Accordingly, the synthetic zircon has nonuniform surface and has much porosity. Therefore, it makes crystallization of glass fine, and its growth is carded out quickly because heterogeneous nucleation site to nucleate at the interface between synthetic zircon powder and mother glass is sufficiently provided. As shown in FIG. 1, in case of Examples 1 and 2, which contain synthetic zircon, crystallization time is reduced to about 20 minutes, which is shorter than in the Comparative Examples.

The synthetic zircon used in the present invention is prepared as follows: First, 67.2 wt % of $ZrO_2$ and 32.8 wt % of $SiO_2$ are mixed, then the mixture is heat-treated at 1440° C. for 12 hours to prepared bulk synthetic zircon and the bulk synthetic zircon is milled and passed through a 250 mesh sieve.

0.1–4.0 wt % of the above-described synthetic zircon is added as a nucleating agent. If the content of the synthetic zircon is less than 0.1 wt %, crystallization time cannot be reduced. If its content is more than 4.0 wt %, the flowability of the sealing glass cannot be ensured, because crystallization occurs substantially before flowability needed for sealing is ensured.

Considering the thermal expansion coefficient of known sealing glass, the range of changing is 97.4–101.5×10$^{-7}$/°C. in the experimental range of 30°–250° C. and 30°–400° C. On the other hand if 4.0 wt % of synthetic zircon is added, crystallization time is about 20 minutes at 420° C. of crystallization temperature. However, the thermal expansion coefficient is 96.9–110.4×10$^{-7}$/°C., this is, the width of changing is large because of increasing of the thermal expansion coefficient of the mother glass. The increasing of the thermal expansion coefficient of the mother glass occurs because the network structure has a loose structure relatively by substituting network forming ions with fluorine in the mother glass.

The large thermal expansion coefficient causes cracking of the seal of the panel and funnel glass of the color TV picture tube.

Therefore low expansion filler must be added to lower the thermal expansion coefficient besides synthetic zircon as a nucleating agent.

Accordingly, in the present invention 0.1–3.0 wt % of cordierite as a filler is added. Although the content of filler is smaller than in the conventional art, its effect of lowering thermal expansion coefficient is sufficient.

Crystallization caused by synthetic zircon added as a filler plays a role of lowering the thermal expansion coefficient. If its content is more than 3.0 wt %, the flowability needed for sealing cannot be ensured and the thermal expansion coefficient is decreased exceedingly.

In this composition, synthetic zircon and cordierite are added simultaneously. Although the total content of them is less than 7 wt %, it allows sealing at 420° C. within about 20 minutes, and the thermal expansion coefficient and mechanical strength are similar or enhanced, relative to the conventional sealing composition. That is, synthetic zircon and cordierite affect effectively.

Consider the composition of PbO—ZnO—$B_2O_3$, devitrifiable glass powder, which consists 74–83 wt % of PbO, 7–10 wt % of $B_2O_3$, 8–12 wt % of ZnO, 1–4 wt % of $SiO_2$, 0.05–0.5 wt % of MgO, 0.1–0.5 wt % of BaO and 0.1–0.5 wt % of F.

In the present invention, if the content of PbO is less than 74 wt %, the glass transition temperature is high and so the sealing temperature of the panel and funnel glass of the TV picture tube is increased. If the content of PbO is more than 82 wt %, a loss of transparency occurs during the glass melting process.

If the content of $B_2O_3$ is less than 7 wt %, transparency loss occurs during the glass melting process, and if the content of $B_2O_3$ is more than 10 wt %, the glass transition temperature is too high. If the content of ZnO is less than 8 wt %, the degree of crystallization is decreased and if the content of ZnO is more than 12 wt %, transparency loss occurs during the glass melting process.

And, if the content of $SiO_2$ is less than 1 wt %, the strength of the glass may be decreased and if the content is more than 4 wt %, the melting point of glass is too high. If the content of BaO is less than 0.1 wt %, it has not effect and if the content is more than 0.5 wt %, glass softening temperature is too high. If the content of fluorine is less than 0.1 wt %, it has no flowability increasing effect and if the content is more than 0.5 wt %, its affects on thermal expansion behavior and mechanical strength of glass are decreased.

If the content of MgO is less than 0.05 wt %, flowability of glass is lost because crystallization of glass occurs difficulty due to excess repressing of crystallization.

Since the synthetic zircon is used as the nucleating agent, cordierite is used as the filler and the used components and these ratios for the glass composition are different from those of the prior art, the composition of the present invention has a similar or enhanced strength, the sealing temperature is reduced from 440° C. to 420° C. and the adhesive time is decreased from 30–40 minutes to about 20 minutes. Therefore, this composition can be effectively used for sealing the panels to the funnels, of color TV picture tubes, with high productivity.

The present invention will be illustrated in more detail by the following examples, but it is not limited by the examples.

EXAMPLES 1–3

Comparative Examples 1–4

Devitrifiable glass powder compositions comprised of PbO, ZnO, $B_2O_3$, $SiO_2$, BaO, MgO and F were prepared as shown in the following Table. These compositions were melted in a platinum crucible at 1200° C. for 2 hours, and formed into ribbon cullet.

The ribbon cullet was ground by a ball-mill and passed through a 100 mesh sieve to obtain the devitrifiable glass powder.

To prepare a synthetic zircon mass, 67.2 wt % of $ZrO_2$ and 32.8 wt % of $SiO_2$ were mixed, heat-treated at 1440° C. for 12 hours, bail-milled and passed through a 250 mesh sieve. The specific surface area of the synthetic zircon was 1.338 m$^2$/g. To prepare the cordierite, it was ball-milled for 20 minutes and passed through a 400 mesh sieve.

The above-described glass powder and additives were respectively weighed according to the ratios set forth in the following Table and mixed to obtain devitrifiable sealing compositions.

The flowability glass transition temperature, bending strength and thermal expansion coefficient and sealing time against the obtained devitrifiable glass powder were measured. The results are shown in the following Table.

In these tests, the flowability was measured by the following method: 10 g of the obtained sealing glass composition was pressed in a cylindrical metallic mould (diameter; 18 mm), laid on a soda-line glass plate and heat-treated according to the stated heat-treatment condition of each sample, and then the outer-diameter was measured.

The transition temperature and crystallization temperature were measured by DSC (Differential Scanning Calorimetry) and the results are shown in FIG. 1. In the curves of Examples 1 and 2, and Comparative Example 1 treating was at 420° C. and for the curve of Comparative Example 2 treating was at 440° C. The thermal expansion coefficient was measured by a TMA (Thermo Mechanical Analyzer). The bending strength an average value measured by following method: each sample was press-moulded by a rectangular mould (40×10×10 mm), heat-treated according to each heat-treatment condition; it was polished by sand paper (#1000) to prepare a sample of 40×10×5 mm size; and the bending strength for the sample was measured by a UTM (Universal Testing Machine) using a 3-point bending method.

TABLE

| Section | | Example 1 | Example 2 | Example 3 | Comparative Example 1 | Comparative Example 2 | Comparative Example 3 | Comparative Example 4 |
|---|---|---|---|---|---|---|---|---|
| Sealing glass composition (wt %) | | | | | | | | |
| Glass powder | Composition | PbO 77 | PbO 77 | PbO 77 | PbO 77 | PbO 75 | PbO 77 | PbO 77 |
| | | ZnO 11 | ZnO 11 | ZnO 11 | ZnO 11 | ZnO 12 | ZnO 11 | ZnO 11 |
| | | $B_2O_3$ 9 | $B_2O_3$ 9 | $B_2O_3$ 9 | $B_2O_3$ 9 | $B_2O_3$ 9 | $B_2O_3$ 9 | $B_2O_3$ 9 |
| | | $SiO_2$ 2.1 | $SiO_2$ 2.1 | $SiO_2$ 2.1 | $SiO_2$ 2.1 | $SiO_2$ 2 | $SiO_2$ 2.1 | $SiO_2$ 2.1 |
| | | BaO 0.3 | BaO 0.3 | BaO 0.3 | BaO 0.3 | BaO 2 | BaO 0.3 | BaO 0.3 |
| | | MgO 0.2 | MgO 0.2 | MgO 0.2 | MgO 0.2 | — | MgO 0.2 | MgO 0.2 |
| | | F 0.4 | F 0.4 | F 0.4 | F 0.4 | — | F 0.4 | F 0.4 |
| | Content | 98.0 | 98.0 | 98.0 | 100.0 | 97.0 | 98.0 | 98.0 |
| Additives | (1) | 1.5 | 1.0 | 0.5 | — | — | 2.0 | — |
| | (2) | 0.5 | 1.0 | 1.5 | — | — | — | 2.0 |
| | (3) | — | — | — | — | 3 | — | — |
| Glass Transfer Point (°C.) | | 303 | 303 | 303 | 303 | 320 | 303 | 303 |
| Bending Strength (Kg/cm³) | | 480 | 487 | 473 | 460 | 480 | 473 | 480 |
| Flow button size (mm) | | 26.90 | 27.07 | 26.95 | 28.00 | 26.90 | 26.27 | 27.44 |
| Thermal Expansion Coefficient ($\times 10^{-7}$/°C.) | | | | | | | | |
| 30–250° C. | | 97.4 | 96.2 | 93.1 | 102.3 | 97.4 | 99.5 | 93.3 |
| 30–400° C. | | 105.8 | 104.2 | 101.7 | 109.2 | 101.5 | 106.2 | 101.6 |
| Sealing Time (min) | | 20 | 20 | 50 | 40 | 18 | 30 | |
| Sealing Temperature (°C.) | | | | 420 | | 440 | | 420 |

Key:
(1) Synthetic Zircon
(2) Cordierite
(3) Natural Zircon

From the above Table and FIG. 1 of the attached drawing Examples 1–3 which use 0.1–4 wt % of synthetic zircon and 0.1–3 wt % of cordierite with respect to Comparative Examples 1–4, it can be seen that the physical properties such as thermal expansion coefficient, flowability and bending strength are improved or similar, and sealing temperature is lowered and sealing time is reduced.

Thus, the sealing composition of the present invention is very effective to improve the productivity of CRT manufacturing for color TV picture tubes.

What is claimed is:

1. A sealing glass composition for sealing between the glass panel and funnel of a color TV glass picture tube, at 420° C. within 20 minutes comprising:

(a) 93–99.8 weight percent PbO—$B_2O_3$—ZnO devitrifiable glass powder made of:

74–82 weight percent PbO,
   7–10 weight percent $B_2O_3$,
   8–12 weight percent ZnO,
   1–4 weight percent $SiO_2$,
   0.05–0.5 weight percent MgO,
   0.1–0.5 weight percent BaO, and
   0.1–0.5 weight percent F;

(b) 0.1–4.0 weight percent synthetic zircon having a specific surface area of 1.0–2.0m²/g, as a nucleating agent; and (c) 0.1–3.0 weight percent cordierite, as a filler.

2. The sealing glass composition of claim 1, wherein: said specific surface area of said synthetic zircon is about 1.338 m²/g.

* * * * *